UNITED STATES PATENT OFFICE.

OSCAR FRANCOIS JOSEPH DUWEZ, OF ENGHIEN, BELGIUM.

PROCESS OF DEVULCANIZING INDIA-RUBBER.

SPECIFICATION forming part of Letters Patent No. 696,423, dated April 1, 1902.

Application filed September 16, 1901. Serial No. 75,531. (No specimens.)

*To all whom it may concern:*

Be it known that I, OSCAR FRANCOIS JOSEPH DUWEZ, a subject of the King of Belgium, residing at Rue d'Hores, Enghien, in the Kingdom of Belgium, have invented certain new and useful Improvements in the Processes of Devulcanizing India-Rubber, of which the following is a specification.

This invention has for its object a process for the industrial utilization of used caoutchouc or india-rubber goods when the india-rubber is present in a quantity sufficient to produce an appreciable benefit, this being effected by giving back to the india-rubber its original qualities, so that it can be again employed as new material.

According to the invention the devulcanization is effected by the action of oxid of calcium (lime) heated to redness upon the sulfur products employed in vulcanization. The reaction which takes place during the carrying out of this process is explained by the following passage from the *Elements de Chimie d'Orfila,* (Vol. 1, page 360:) "The sulfur combines with the lime which has been heated to redness and yields a product which has the power of forming a soluble hydrosulfate of lime."

In carrying out the invention I advantageously proceed as follows: The lime can be prepared directly by intense calcination in a muffle or furnace of refractory earth, or I can employ other products or agents containing lime heated to redness, notably cement, which gives very good results, the lime having been subjected in the manufacture of cement to a considerably higher temperature than that required to expel the carbonic acid from limestone in the usual manufacture of lime. The calcic product is then sifted, so that an impalpable powder is obtained. The residue can be reground and again employed. The calcic product is introduced into water. The proportion depends upon the quantity of lime which it contains and in the quantity of sulfur which is contained in the caoutchouc, as also upon the quality of the latter. Good results are generally obtained by employing a product containing lime of a good quality in quantity from about thirty to fifty per cent., by weight, of the india-rubber. The india-rubber to be treated is then kneaded, so as to provide as thin and large a surface as possible to be subjected to the action of the devulcanizing product or agent. The prepared material is then placed in the solution and heated to boiling-point, being frequently agitated. The operation is finished when the solution assumes a clear yellow or red coloration, according to the products employed.

In general for good india-rubber it suffices if the boiling process is allowed to continue for fifteen to twenty minutes. The liquid is then decanted or the caoutchouc removed and washed. It is then rolled to cleanse it from the devulcanizing solution and to cause it to assume a certain consistency. In this state it can be treated with the revulcanizing product and be revulcanized as new caoutchouc.

Vulcanized rubber being of very variable composition by reason of the different products which the manufacturer introduces into it, it may be necessary that the devulcanization process shall last much longer than above described, and it may be necessary to double or even increase still more the proportion of lime or cement. It may also be necessary sometimes to add one of the well-known adjuncts—for example, sugar, salts of lead, baryte, glycerin, caustic alkalies, or carbonates, according to the composition of the caoutchouc. These substances are added to the calcic bath. In this case, however, the "devulcanization," properly so called, of the india-rubber is always due to the action of the lime or of the cement upon the vulcanizing sulfur products.

I am aware that lime has already been used for the devulcanization of india-rubber; but this was always ordinary lime, the action of which on the sulfur is not such as to produce a soluble lime salt, the consequence of which was that the product resulting from the combination could not be removed from the india-rubber.

What I claim is—

1. In the process of devulcanizing india-rubber the improvement consisting in subjecting the india-rubber, in the presence of water, to the action of an agent containing lime having been heated to redness.

2. In the process of devulcanizing india-rubber the improvement consisting in subjecting the india-rubber, in the presence of water, and with intervention of heat to the action of an agent containing lime having been heated to redness substantially as described.

3. In the process of devulcanizing india-rubber the improvement consisting in subjecting the india-rubber in the presence of water and with intervention of heat to the action of lime having been heated to redness in combination with one or more of the usual adjuncts substantially as described.

4. In the process of devulcanizing india-rubber the improvement consisting in first preparing lime by intense calcination, then sifting the lime and introducing it into water, then kneading the india-rubber, placing it in the solution and boiling, finally removing the india-rubber and washing substantially as described.

In witness whereof I have hereunto set my hand in presence of two witnesses.

OSCAR FRANCOIS JOSEPH DUWEZ.

Witnesses:
GREGORY PHELAN,
GEO. W. ROOSEVELT.